(12) United States Patent
Permakoff

(10) Patent No.: US 8,370,390 B1
(45) Date of Patent: Feb. 5, 2013

(54) METHOD AND APPARATUS FOR IDENTIFYING NEAR-DUPLICATE DOCUMENTS

(76) Inventor: Vadim Permakoff, Mahwah, NJ (US)

( * ) Notice: Subject to any disclaimer, the term of this patent is extended or adjusted under 35 U.S.C. 154(b) by 0 days.

(21) Appl. No.: 13/284,919

(22) Filed: Oct. 30, 2011

(51) Int. Cl.
*G06F 7/00* (2006.01)
*G06F 17/30* (2006.01)

(52) U.S. Cl. ........................................ 707/786; 707/802

(58) Field of Classification Search .................. 707/687, 707/803
See application file for complete search history.

(56) References Cited

U.S. PATENT DOCUMENTS

| 2007/0130188 A1* | 6/2007 | Moon et al. ................... 707/101 |
| 2009/0049062 A1* | 2/2009 | Chitrapura et al. ........... 707/100 |
| 2012/0060082 A1* | 3/2012 | Edala et al. ................... 715/231 |

* cited by examiner

*Primary Examiner* — Kuen Lu

(57) ABSTRACT

Duplicate or near-duplicate documents can be identified by creating a vector representing the evaluated document, where vector values are serial numbers of the summary vector coordinates, sorted according to the value in each coordinate. The summary vector is calculated summing bits of hashes of the document shingles. Vectors representing other documents can be reduced in size to 64-bit fingerprints and stored in permanent memory. The duplicates or near-duplicates can be identified by comparing these stored fingerprints with the vector representing evaluated document.

9 Claims, 4 Drawing Sheets

METHOD AND APPARATUS FOR IDENTIFYING NEAR-DUPLICATE DOCUMENTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

A. Field of the Invention

This invention is in the field of computerized processing of documents, and more particularly it is about creating a measurement of similarity, so that duplicate and near duplicate documents can be identified.

In regard to present invention the term "document" is broadly interpreted and represents documents such as Web pages, text files, multimedia files, DNA sequence files, etc.

B. Description of the Related Art

In many computer systems, it is useful to determine the resemblance between documents stored in the system. One example is cataloging the large number of documents that are identical or nearly identical. Another example is a need for removal of near-identical documents, which are created by copying of documents or making gradual small changes in documents (producing different versions). The storage space can be reduced significantly by storing only one version of a set of similar documents.

From the search engine's perspective, there is a problem of serving search results containing large number of identical or nearly identical documents. It is desirable for the search engine to identify such documents to remove duplication from search results.

Therefore, it is desired to provide a method that can determine the resemblance of documents.

A naive solution would be to compare all pairs of documents, but on large datasets it is a prohibitively expensive approach.

Existing techniques for detecting duplicate and near-duplicate documents involve generating so-called "fingerprints" of documents, and two documents are considered to be near-duplicates if they share more than a predetermined number of fingerprints. Broder et al. (U.S. Pat. No. 6,349,296, (February 2002)) used such technique to find near-duplicate Web pages.

Hoad and Zobel (T. C. Hoad and J. Zobel, "Methods for identifying versioned and plagiarised documents," Journal of the American Society for Information Science and Technology, 54(3), pp. 203-215 (2003)) compared existing methods for identifying versioned and plagiarized documents and proposed their own approach.

Pugh at al. (U.S. Pat. No. 6,658,423, (December 2003)) developed a technique assigning a number of fingerprints to a given document and considering two documents to be near-duplicates if any one of their fingerprints match.

Another approach was developed by Charikar (U.S. Pat. No. 7,158,961, (January 2007)), which employs a similarity engine generating compact representations of objects called sketches. Sketches of different objects can be compared to determine the similarity between the two objects.

In both the Broder and Charikar algorithms, each document (HTML page) is converted into a token sequence and both algorithms generate a bit string from the token sequence of a page and use it to determine the near-duplicates for the page, which is consistent with present invention.

The Charikar algorithm ignores the order of tokens, but accounts for the frequency of terms. The Broder algorithm accounts for the order of the tokens, however, it ignores the frequency of shingles. For both algorithms there can be false positives (non near-duplicate pairs returned as near-duplicates), as well as false negatives (near-duplicate pairs not returned as near-duplicates). Henzinger researched Broder and Charikar algorithms and proposed a solution for large datasets (U.S. Pat. No. 8,015,162, (September 2011)) as a combination of both.

Shen's "Document near-duplicate detection" method (U.S. Pat. No. 7,962,491, (June 2011)), also includes generation of compact "fingerprint" that describes the contents of the document. The similarity detection component compares multiple fingerprints based on the hamming distance between the fingerprints. When the hamming distance is below a threshold, the documents can be said to be near-duplicates of one another.

BRIEF SUMMARY OF THE INVENTION

Systems and methods consistent with the present invention generate compact representations of documents that can be compared to determine a similarity between the documents.

An exemplary method for detecting one or more documents that are duplicate or near-duplicate of evaluated document can include steps of obtaining the document, retrieving a set of the document shingles, creating a vector representing evaluated document, where vector values are serial numbers of coordinates of the summary vector, which is obtained by summing bits of hashes of the document shingles, and then detecting one or more documents that are duplicate or near-duplicate of evaluated document by comparing common values in reduced dimension vectors (fingerprints) representing other documents, with the values in the vector representing evaluated document and applying a similarity definition with predefined similarity threshold value.

One or more embodiments of the invention can be implemented in a form of the computer product including a tangible computer readable storage medium with computer usable program code for performing the method steps indicated. Furthermore, one or more embodiments of the invention or elements thereof can be implemented in the form of hardware and software modules for carrying out the method steps described herein.

DETAILED DESCRIPTION OF THE INVENTION

This invention is not bound by any specific application. Thus, by way of non-limiting example, this technique can be used for determining duplicate or near duplicate documents such as Web pages, text files, multimedia files, DNA sequence files, etc.

Embodiments of the present invention use terms such as, processor, computer, apparatus, system (in single or plural form) for performing the operations herein. This may be specially constructed for the desired purposes, or it may comprise a general-purpose computer activated or configured by a computer program stored in the computer medium suitable for storing electronic instructions.

Figure 1:
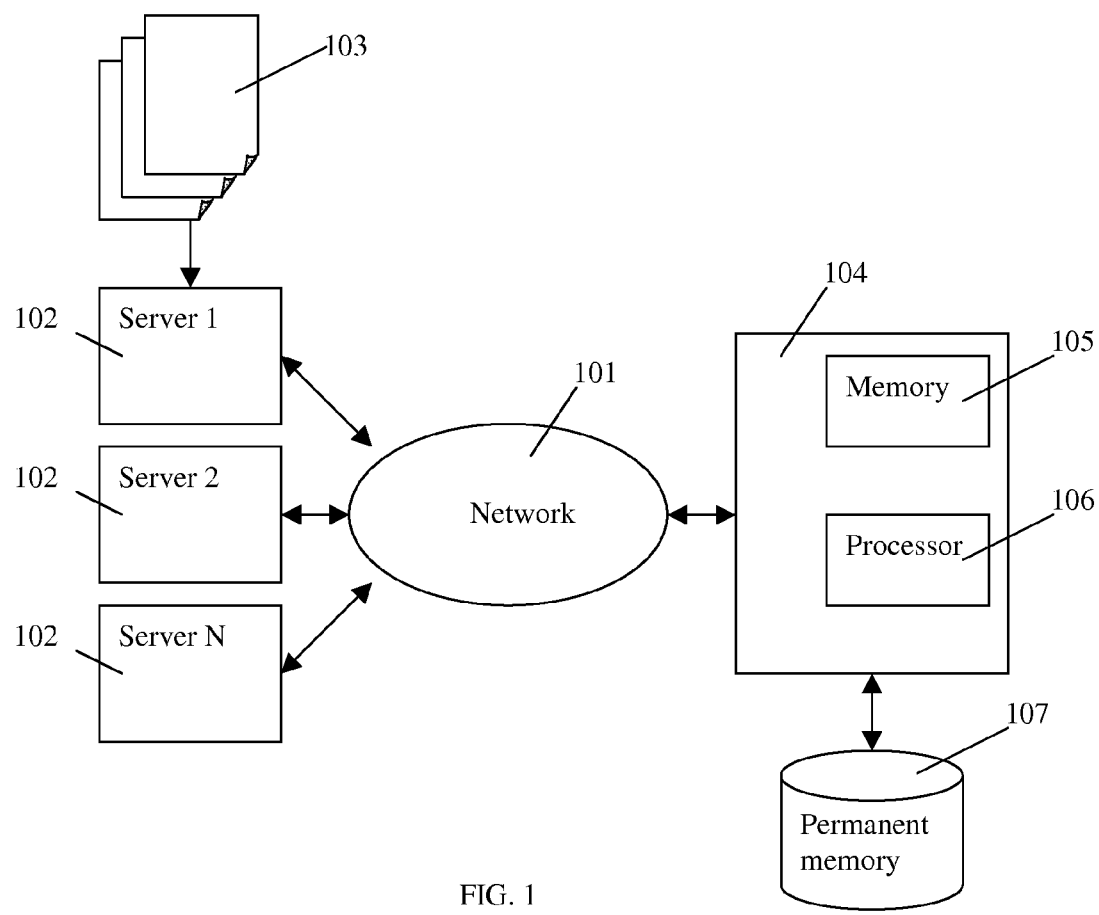
FIG. 1 is a block diagram of an environment in which at least some aspects of the present invention may be used.

FIG. 1 shows an exemplary system as a network of computers. The network 101 includes servers 102 storing evaluated documents 103 and data associated with these documents, and a device 104 carrying out the method steps described herein. The device 104 can be constructed as a computer, which has a readable medium 105, such as random access memory, the processor 106 to execute the program instructions and a permanent memory 107 to store the data and program instructions, such as a hard disk.

Documents 103 are acquired by servers 102 and transferred to the computer 104 over the network 101. In an implementation consistent with the principles of the invention, the computer 104 receives the document and creates a vector representing evaluated document and then compares this vector with reduced dimension vectors (fingerprints) representing other documents to determine if the document has duplicates or near-duplicates among previously received documents.

The obtained vector representing evaluated document can be reduced in size and called a fingerprint, which can be stored for future comparison in a random access memory 105 for quick access, or in permanent memory 107 and accessed later locally, or it can be transferred over the network 101 to one of servers 102 and stored there using a database or the search engine index.

Figure 2:
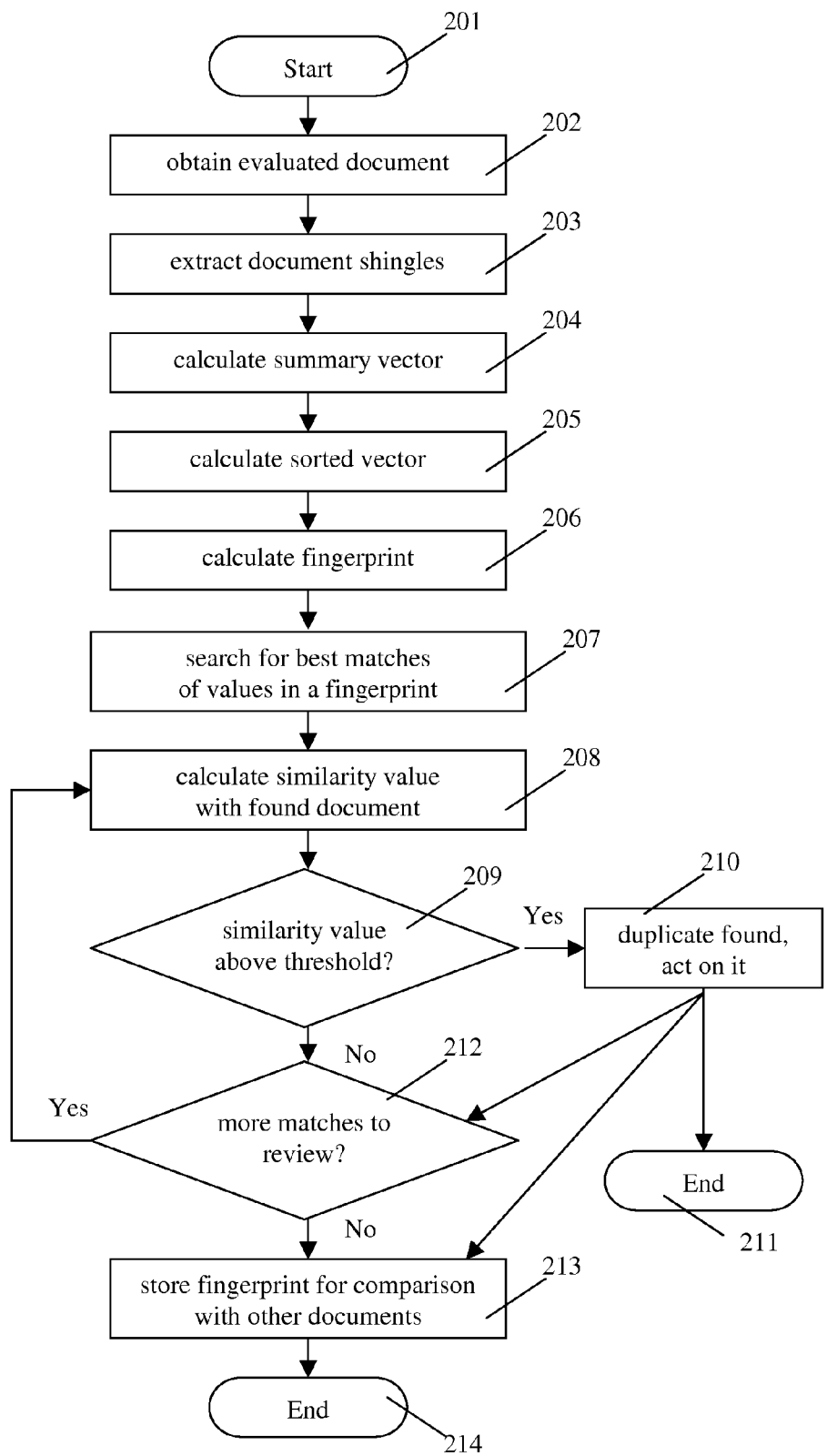
FIG. 2 illustrates a sequence of operations, in accordance with an embodiment of the invention.

FIG. 2 illustrates a sequence of operations, in accordance with an embodiment of the invention.

At the start 201-202 the evaluated document is obtained. The set of shingles is extracted from the document in block 203. For text documents it may be a set of w-shingles, for example, with length w equal to 5.

In block 204, a hash is generated for each document shingle and the summary vector is created with n coordinates, where n equals the number of bits of the hash value. The length of the hash value is defined here to be 256 bit, but it can be longer or shorter. Each bit of the hash value is added to the summary vector coordinate corresponding to that bit in the hash value. When all document shingles are processed, the summary vector is calculated.

In block 205 the summary vector coordinates are sorted according to coordinates values and a sorted vector is created from serial numbers of sorted coordinates. This sorted vector is used to calculate the similarity of the documents.

Figure 3:
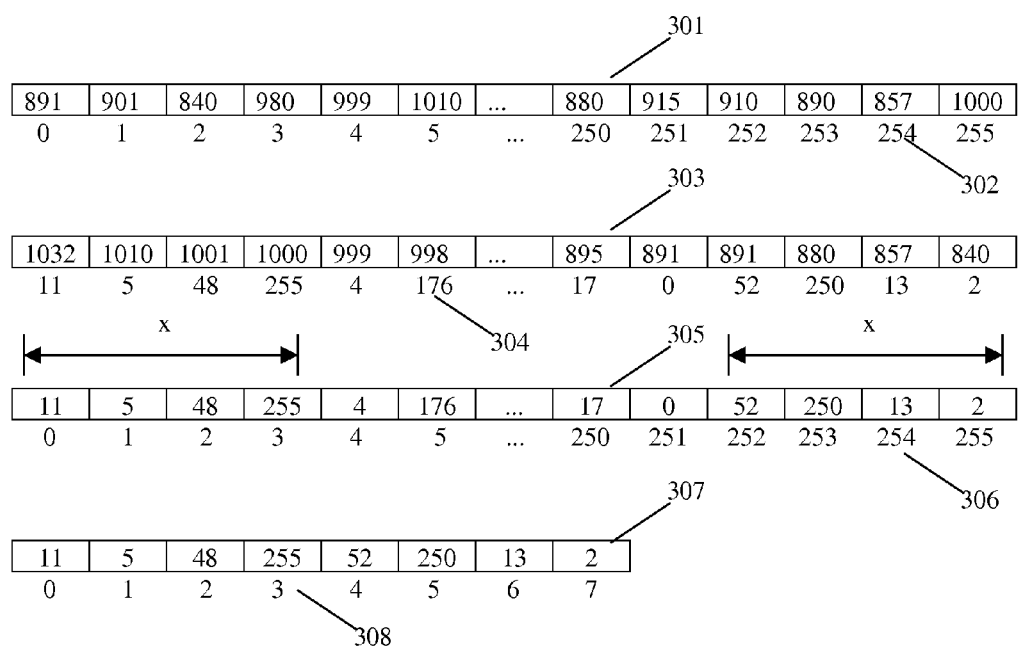
FIG. 3 illustrates the calculation of a sorted vector and a fingerprint of evaluated document.

In block 206 the document fingerprint is created, which is a reduced dimension vector populated with values from the sorted vector. FIG. 3. provides details of creating the reduced dimension vector. The length of a fingerprint is 64 bit, and it contains internally 8 values from the sorted vector.

Figure 4:
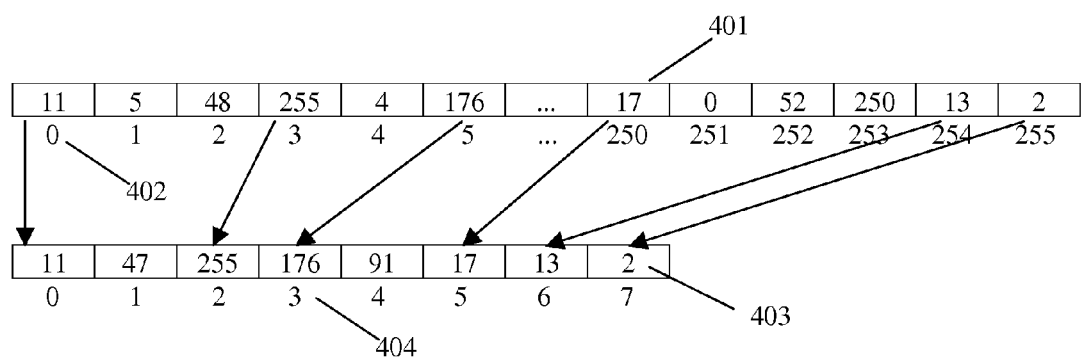
FIG. 4 illustrates the calculation of a similarity value comparing the sorted vector of evaluated document with a fingerprint of the other document.

In block 207 the values from a fingerprint are searched within values of stored fingerprints of other documents, and the similarity value, which is a real number, is calculated in block 208. FIG. 4. provides details of calculating the similarity value.

The similarity value is compared with the threshold in block 209 and if the similarity value is below the threshold, the duplicate or near duplicate document is found.

In block 210 the action may include a removal of evaluated document, or placement of this document in the same group with found duplicate document, or removal of found duplicate document, etc. The action may also include a step of documents similarity verification, which can be done using the same technique as described in present invention, but creating a different set of shingles for evaluated and found documents, and applying this technique to compare only these two documents. The different set of document w-shingles can be created defining longer or shorter length w. For large sets of documents several fingerprints obtained from different sets of shingles can be calculated for similarity verification and stored in memory for each document. The precision of this method can be increased significantly with such step of similarity verification.

If the duplicate is found and evaluated document has to be removed, the process ends in block 211. But if the document has to be compared with other documents, or if the fingerprint of evaluated document has to be stored for future comparisons, the process is continued to block 212 or 213 accordingly.

In block 212 the process is continued for all documents selected for comparison in block 207. If evaluated document does not need to be deleted, the fingerprint of the document is stored in block 213 for future comparison with other documents.

FIG. 3. illustrates the calculation of a sorted vector and a fingerprint of evaluated document. The summary vector 301 with coordinates 302 is calculated according to description for block 204, FIG. 2. When the summary vector is created, the coordinates 302 are sorted according to values in vector 301, so that the sorted vector 303 is obtained with corresponding coordinates 304. New vector 305 is formed from coordinates 304, with coordinates 306. The values in vector 305 have length 8 bit, because this is the length required to represent coordinates of vector 301. The reduced dimension vector 307 with coordinates 308 is formed from first x and last x values of vector 305. This reduced dimension vector is the fingerprint of a document, which is used for future comparisons with other documents. The x is defined equal to 4, so the fingerprint forms 64 bit value.

FIG. 4 illustrates the example of calculation the similarity value comparing sorted vector 401 of evaluated document, with a fingerprint 403 of the other document. The similarity value is calculated as a sum of differences in a position of the same value in the fingerprint 403 with a position of the same value in sorted vector 401. First x coordinates 402 of sorted vector 401 correspond to first x coordinates 404 of a fingerprint 403. Last x coordinates 402 of sorted vector 401 correspond to last x coordinates 404 of a fingerprint 403. Lines with arrows on the drawing display a match between values of sorted vector and a fingerprint. For example, if value 176 in a fingerprint 403 is in a coordinate 3, and the same value in sorted vector 401 is in a coordinate 5, then the difference for a fingerprint coordinate 3 is: 5−3=2. If value 13 in the fingerprint 403 is in a coordinate 6, which corresponds to sorted vector coordinate 254, and the same value in sorted vector 401 is in coordinate 254, then the difference for fingerprint's coordinate 6 is: 254−254=0. Total similarity value equals to a sum of all differences. The similarity value can be normalized dividing calculated sum of all differences to predefined value, for example, to n.

When the similarity value is calculated, the value is compared to predefined threshold, and if the similarity value is lesser then the threshold, the documents are considered to be duplicates or near duplicates.

What I claim as my invention is:

1. A computer-implemented method for identifying duplicate and near-duplicate documents, the method comprising:
   a) obtaining the document and extracting from the document a set of shingles;
   b) creating for this document a summary vector with n coordinates,
   wherein the n is a nature number;
   c) sorting coordinates of a summary vector;
   d) creating a vector representing evaluated document from the serial numbers of sorted coordinates;
   e) creating a document fingerprint as a reduced dimension vector from the vector representing evaluated document; and
   f) comparing the vector representing evaluated document with fingerprints of other documents to identify a duplicate or a near-duplicate of evaluated document.

2. The computer-implemented method of claim 1, wherein the summary vector with n coordinates is determined by calculating an n-bit size hash value for each document shingle and adding each bit of hash value to corresponding coordinate of a summary vector.

3. The computer-implemented method of claim 1, wherein the coordinates of a summary vector are sorted according to the values in coordinates and the serial numbers of coordinates form a vector representing evaluated document.

4. The computer-implemented method of claim 1, wherein the document fingerprint is created from the first x and last x coordinates of the vector representing evaluated document, and the fingerprint is stored in memory to be compared with vector representing another evaluated document.

5. The computer-implemented method of claim 1, wherein the list of documents for comparison with evaluated document is obtained searching for best matches within fingerprints of other documents for values from the fingerprint of evaluated document.

6. The computer-implemented method of claim 1, wherein two documents are identified as a duplicate or a near-duplicate comparing the difference in coordinates of the same value present in the fingerprint of another document and in the vector representing evaluated document.

7. The computer-implemented method of claim 2, wherein n is equal to 256.

8. The computer-implemented method of claim 4, wherein x is equal to 4.

9. A machine-readable non-transitory medium having stored thereon machine-executable instructions which, when executed by a machine, perform a method comprising:
   a) obtaining the document and extracting from the document a set of shingles;
   b) creating for this document a summary vector with n coordinates,
   wherein the n is a nature number;
   c) sorting coordinates of a summary vector;
   d) creating a vector representing evaluated document from the serial numbers of sorted coordinates;
   e) creating a document fingerprint as a reduced dimension vector from the vector representing evaluated document; and
   f) comparing the vector representing evaluated document with fingerprints of other documents to identify a duplicate or a near-duplicate of evaluated document.

* * * * *